Patented Jan. 5, 1932

1,840,157

UNITED STATES PATENT OFFICE

CHARLES FREDERICK CROSS, OF LONDON, ENGLAND, AND ALF ENGELSTAD, OF VARDAL, NORWAY

MANUFACTURE OF NEW PRODUCTS COMPRISING LIGNONE DERIVATIVES

No Drawing. Original application filed September 15, 1926, Serial No. 135,703, and in Great Britain September 21, 1925. Divided and this application filed March 7, 1928. Serial No. 259,903.

This invention relates to the manufacture of new products comprising lignone derivatives obtainable as by-products in the manufacture of wood pulp from wood, and is a division of our United States application Serial No. 135,703, filed 15th September, 1926.

In the processes of pulping wood based on the action of aqueous sulphurous acid or bisulphites, on the wood, the lignone components are obtained in a water-soluble form (conditioned by the acid group $SO_3H$ in combination with the lignone complex) in the liquor; this liquor, after separation from the wood pulp, may be treated in various ways to yield products useful in industry, for instance in tanning. The liquor may be concentrated, with or without such treatment, and with or without neutralization, until the content of solid material is comparatively high, without considerable loss of fluidity; for example the liquor may be concentrated until it contains over 50 per cent. of solid material, while still remaining more or less fluid.

In our aforesaid United States application Serial No. 135,703 (series of 1925) we have described the application of oxidation products made from the lignone derivatives obtainable by the sulphurous acid or bisulphite treatment of wood substance.

We have found that the water soluble condensation products which can be made from the lignone derivatives obtainable by the sulphurous acid or bisulphite treatment of wood substance (that is, the treatment of wood substance with aqueous sulphurous acid with or without the addition of a proportion of a base such as lime or magnesia) have likewise a high solvent, and emulsifying or dispersing power in respect of substances normally immiscible with water, particularly hydrocarbons of high molecular weight. Thus, useful products can be made by mixing in any desired proportion the more concentrated solutions of condensation products of the lignone derivatives, with hydrocarbons of high molecular weight, or with mixtures thereof, such as the tars produced in the destructive distillation of wood, coal or the like, or residues from the distillation of mineral oils, or natural products of a like character. The products may have the appearance of true solutions and may be diluted with water in moderate amounts without causing any appreciable separation; as the dilution is increased, a point is reached at which the product passes into the form of a stable emulsion. The mixtures may also be mixed with many by-products of similar character, such as bitumen, cotton-seed pitch, and oils and fats, such as linseed-oil, tung-oil, or tallow. Owing to the fact that the mixtures obtained by the invention may contain a considerable quantity of water, they may also be mixed with a number of water soluble compounds, for instance with many dyestuffs, or with suitable inorganic salts, in order to modify the mixtures for particular applications.

When there are used, according to the invention, certain hydrocarbon mixtures of a less fluid nature, such as bitumen, asphalt or the like, they are first brought into a fluid state by addition of a proportion of a suitable solvent, preferably a solvent hydrocarbon, before mixing with the solution of the lignone derivatives.

The condensation products of the lignone derivatives may be made by subjecting the latter, prior to admixture with the hydrocarbon or the like, to a preliminary treatment in relatively dilute solution with a substance adapted to cause condensation, such as hydrochloric acid or ferric chloride, after which the solution is evaporated until pasty, and the residue is taken up in water. The solution so obtained is, moreover, capable of dissolving substantial proportions of certain mineral oxides, such as hydrated ferric oxide.

The products obtainable in accordance with the invention find application for various purposes for which aqueous emulsions of hydrocarbons are used, particularly as protective paints, and in the manufacture of weather-resistant fabrics such as roofing felt.

The high dispersive power of the condensation products from the lignone derivatives obtainable by the sulphurous acid or bisulphite treatment of wood substance may also be utilized in respect of the dispersion of finely divided solids. In particular, the products obtained from the aforesaid lignone derivatives by condensation alone or with other substances, find a useful application in connection with solutions from which undesirable insoluble deposits tend to separate, an addition of the aforesaid condensation products to such a solution preventing in many cases deposition of insoluble matter.

The invention is particularly applicable to the condensation products of the lignone derivatives obtained by the sulphurous acid treatment of wood described in U. S. Patent No. 1,547,907 of July 28, 1925 to C. F. Cross and British Patent No. 202,016.

The following examples illustrate the invention:—

(1) The liquor from the sulphurous acid or bisulphite treatment of wood, is concentrated until the content of solid matter is about 37 per cent. To 100 parts by volume of this concentrated extract are added 10 parts of concentrated hydrochloric acid, and the mixture is evaporated on the water bath until it is in a pasty condition, approximating to dryness. The residue is taken up with water and the solution made up to the original volume of 100 parts by additions of water. As compared with the original concentrated solution, the solution so obtained shows a marked increase in viscosity, and mixes readily with its own volume of tar or other hydrocarbons, forming a homogeneous liquid, which on dilution with water, yields a stable emulsion.

(2) To 130 parts by weight of the concentrated lignone extract (having a content of solids of 37%), as used in Example 1, there are added 4 parts of ferric chloride, and the mixture is evaporated on the water-bath until it is in a pasty condition, approximating to dryness. The residue when dissolved in water and made up to the original volume of the concentrated lignone extract used as parent material, may be mixed readily with 10 parts of ferric oxide in the form of hydrate, which dissolves on warming the mixture. The product obtained by mixing this solution with tars (for example with 10 parts of coal tar or wood tar), as previously described, is useful for application to surfaces as a protective paint.

The expression "aqueous dispersions" as used in the appended claims is intended to include any system in which the substance normally immiscible with water (for example, a hydrocarbon of high molecular weight) is dispersed throughout an aqueous medium, whether the substance is in solution in the medium, or emulsified or suspended therein.

The term "treatment of wood with an aqueous solution containing sulphurous acid anions" used in the appended claims is intended to include the treatment of wood substance with aqueous sulphurous acid in absence of a base, as well as with aqueous sulphurous acid in presence of a base, such as lime or magnesia, or in presence of a small quantity of ammonia as described in said U. S. Patent No. 1,547,907.

Having thus fully described the nature of the said invention and the best means we know of carrying the same into practical effect, we claim:—

1. A method of producing stable aqueous dispersions, of substances normally immiscible with water, which comprises forming a mixture containing water, a substance normally immiscible with water, and water-soluble condensation products of the soluble lignone derivatives obtainable by the treatment of wood with an aqueous solution containing sulphurous acid anions.

2. A process for the manufacture of products comprising lignone derivatives, which process comprises incorporating a hydrocarbon of high molecular weight with a concentrated solution of water-soluble condensation products of the soluble lignone derivatives obtainable by the treatment of wood with an aqueous solution containing sulphurous acid anions.

3. A process for the manufacture of products comprising lignone derivatives, which process comprises treating a metal oxide and a hydrocarbon of high molecular weight with a concentrated solution of water-soluble condensation products of the soluble lignone derivatives obtainable by the treatment of wood with an aqueous solution containing sulphurous acid anions.

4. A process for the manufacture of products comprising lignone derivatives, which process comprises treating hydrated ferric oxide and a hydrocarbon of high molecular weight with a concentrated solution of water-soluble condensation products of the soluble lignone derivatives obtainable by the treatment of wood with an aqueous solution containing sulphurous acid anions.

5. Aqueous dispersions comprising a solution of water soluble condensation products of the lignone derivatives obtainable by the treatment of wood with an aqueous solution containing sulphurous acid anions and a substance normally immiscible with water dispersed throughout said solution.

6. Aqueous dispersions comprising a solution of water soluble condensation products of the lignone derivatives obtainable by the treatment of wood with an aqueous solution containing sulphurous acid anions and a hydrocarbon of high molecular weight dispersed throughout said solution.

In testimony whereof we have signed our names to this specification.

CHARLES FREDERICK CROSS. [L. S.]
  ALF ENGELSTAD. [L. S.]